6 Sheets—Sheet 1.

J. FOX.

CRACKER-MACHINE.

Reissued July 18, 1876.

No. 7,230.

Witnesses:

P. C. Dieterich

F. H. Duff

Inventor:

Joseph Fox

Per C. H. Watson & Co Attorneys.

6 Sheets—Sheet 2.

J. FOX.

CRACKER-MACHINE.

No. 7,230. Reissued July 18, 1876.

Witnesses:

P. C. Dieterich

F. H. Duffy

Inventor:

Josefer Fox per:

Attorneys.

C. H. Watson & Co.

6 Sheets—Sheet 3.
J. FOX.
CRACKER-MACHINE.
Reissued July 18, 1876.
No. 7,230.
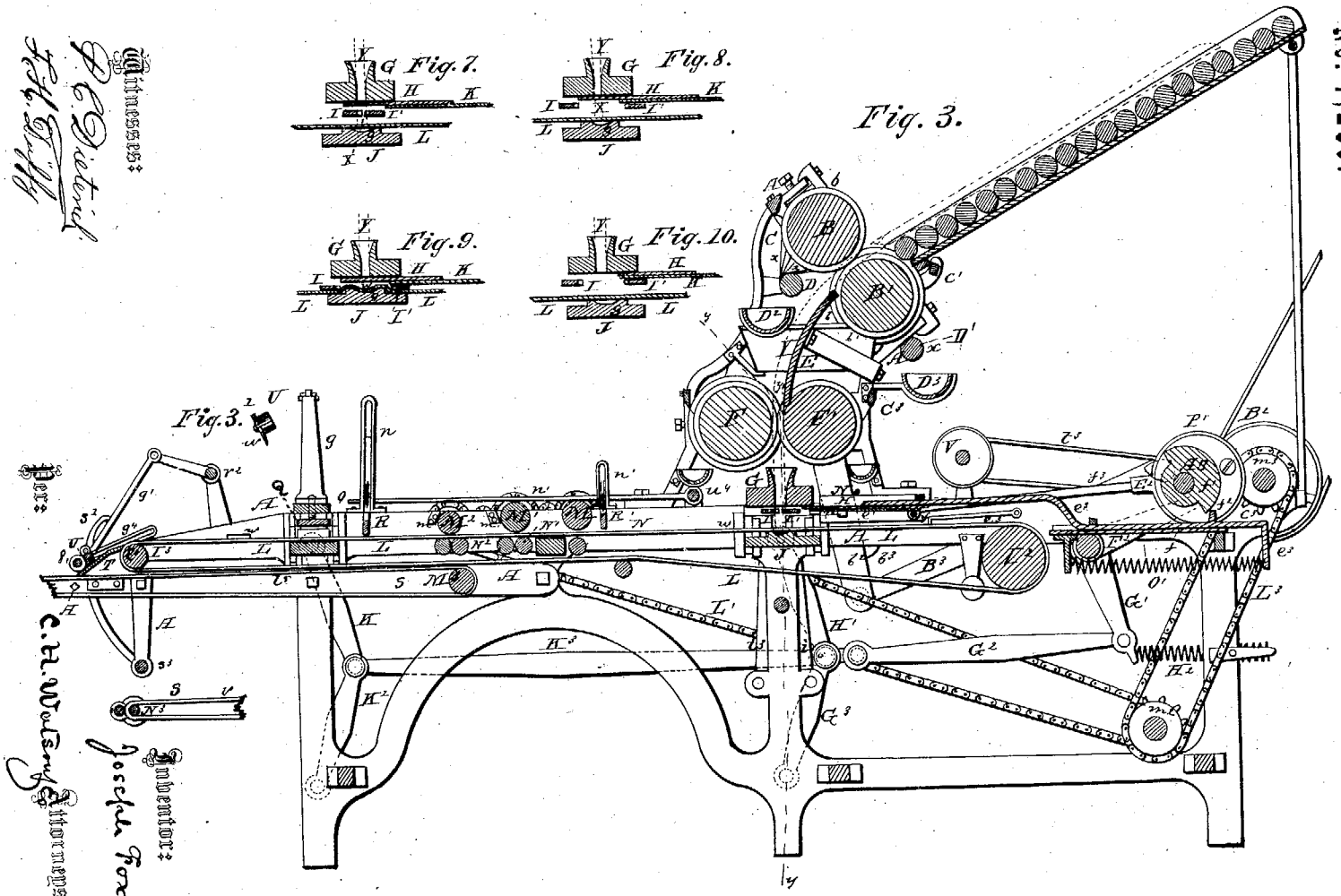
Witnesses:
P. C. Dieterich
F. H. Duffy
Inventor:
Joseph Fox
Per: C. H. Watson, Attorney.

6 Sheets—Sheet 4.

J. FOX.

CRACKER-MACHINE.

Reissued July 18, 1876.

No. 7,230.

Witnesses:

P. C. Dieterich.

F. H. Duffy.

Inventor:

Joseph Fox

Per: C. H. Walker & Co. Attorneys.

6 Sheets—Sheet 5.

J. FOX.

CRACKER-MACHINE

No. 7,230. Reissued July 18, 1876.

Witnesses:

P. C. Dieterich

F. H. Duffy

Inventor:

Joseph Fox

Per: C. H. Walbourn & Co. Attorneys.

J. FOX.

CRACKER-MACHINE.

No. 7,230. Reissued July 18, 1876.

Witnesses:
P. C. Dieterich.
F. H. Duffy

Inventor:
Joseph Fox
Per: C. H. Watson & Co. Attorneys.

UNITED STATES PATENT OFFICE.

JOSEPH FOX, OF LANSINGBURG, NEW YORK.

IMPROVEMENT IN CRACKER-MACHINES.

Specification forming part of Letters Patent No. 22,793, dated February 1, 1859; reissue No. 3,415, dated May 4, 1869; extended seven years; reissue No. 7,230, dated July 18, 1876; application filed April 8, 1876.

DIVISION A.

*To all whom it may concern:*

Be it known that I, JOSEPH FOX, of Lansingburg, in the county of Rensselaer and State of New York, have invented certain new and useful Improvements in Cracker-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
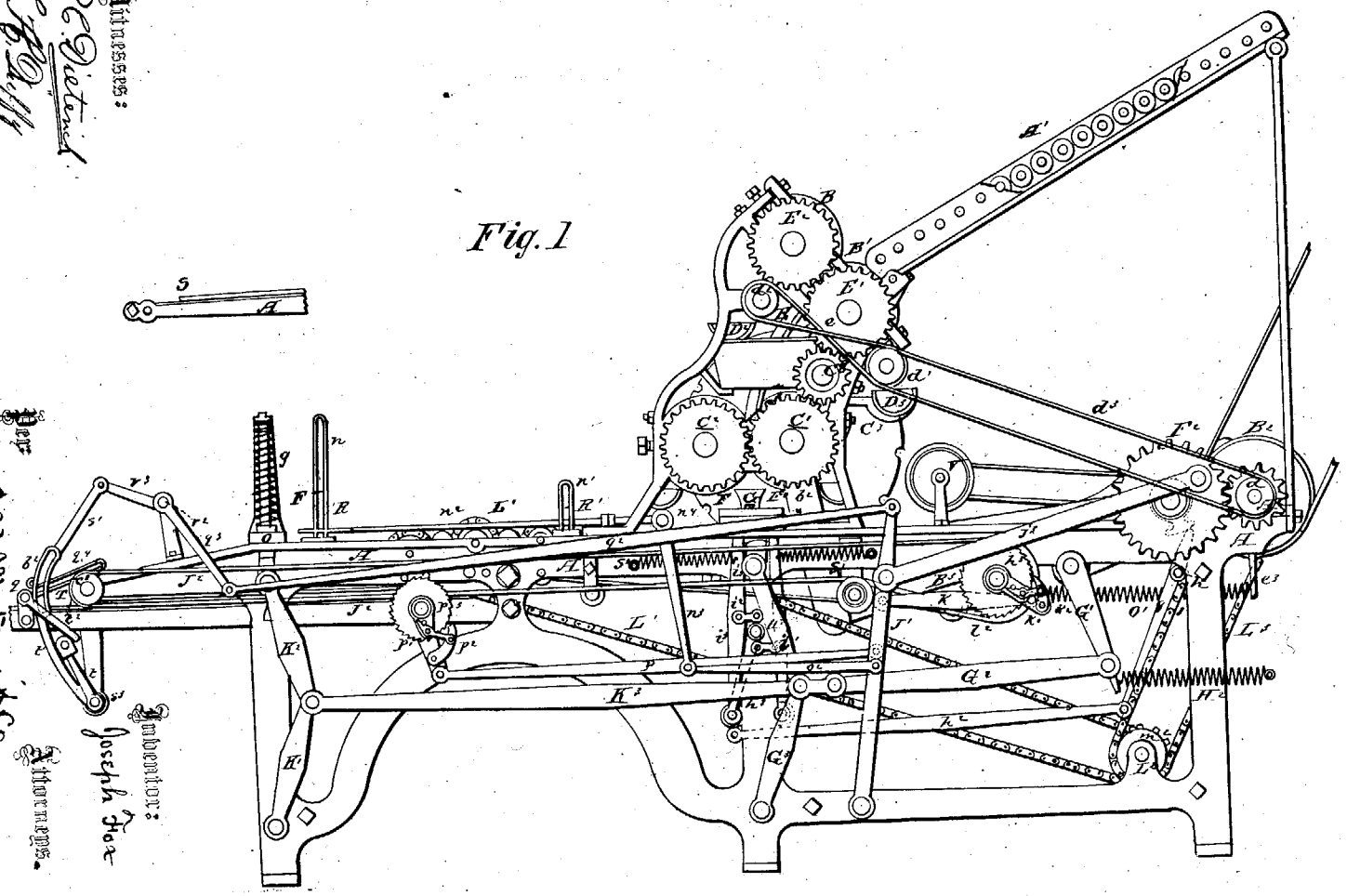
Figure 2:
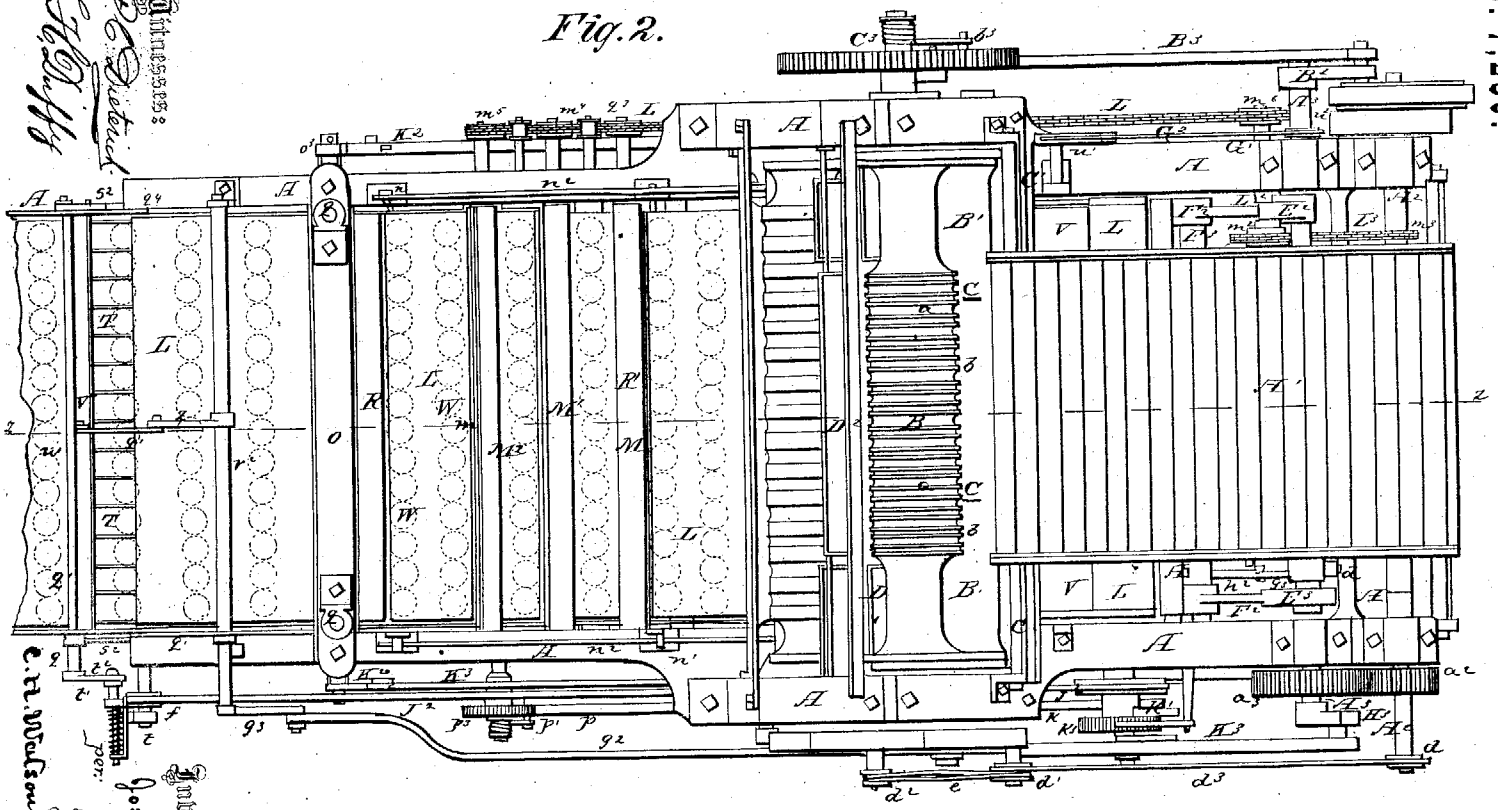
Figures 4, 5:
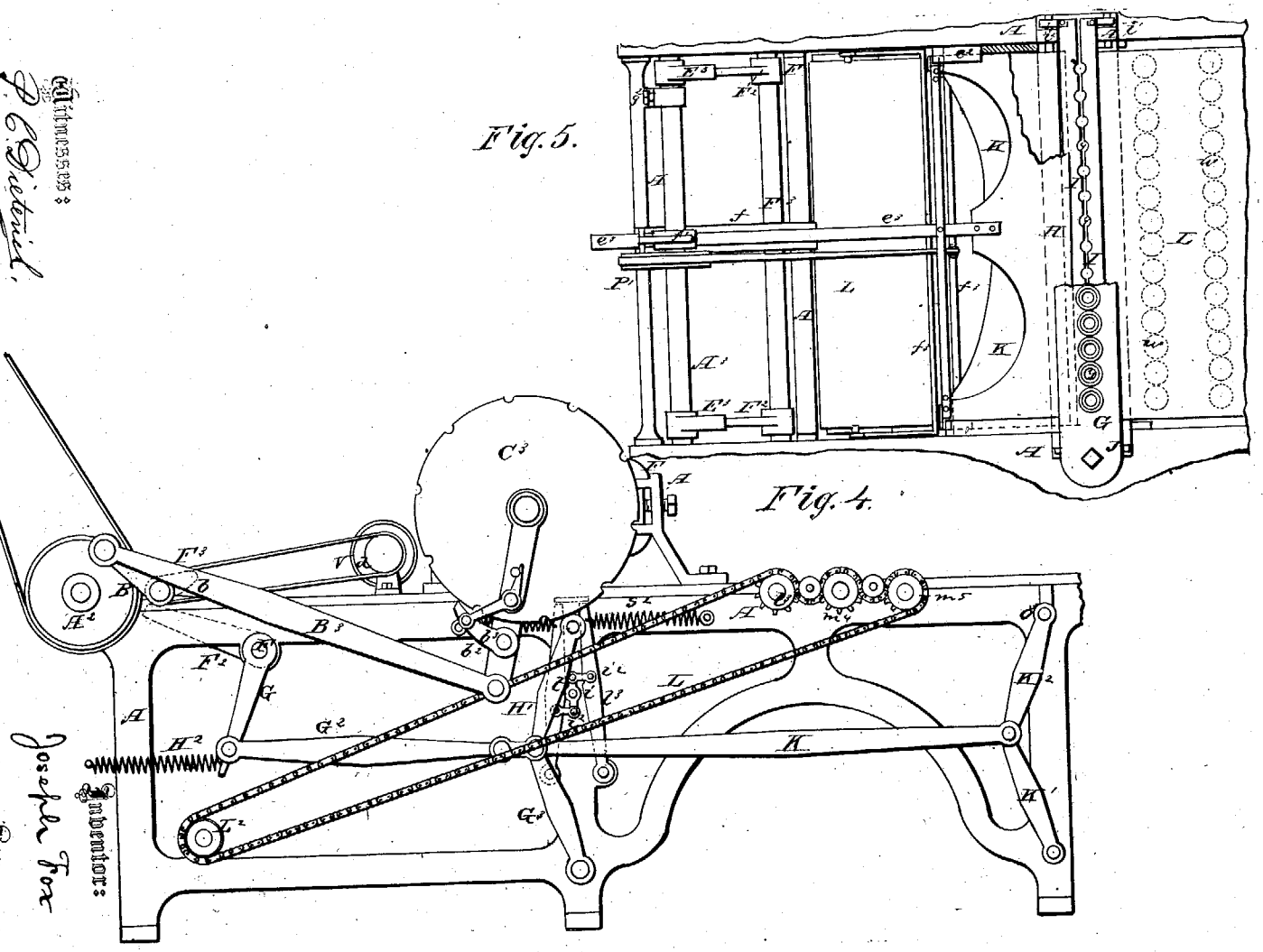
Figure 6:
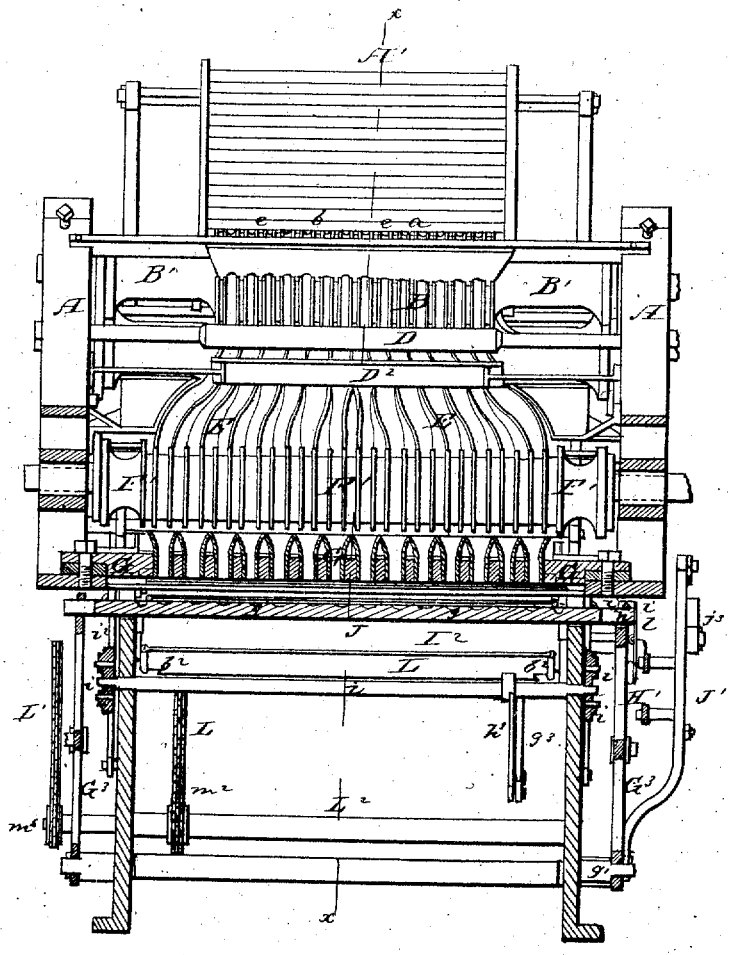
Figure 11:
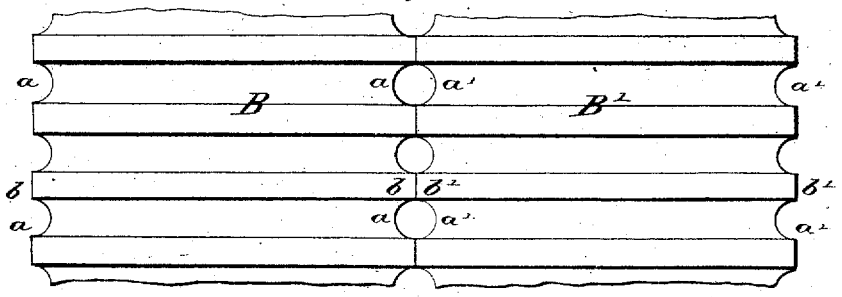
Figure 12:
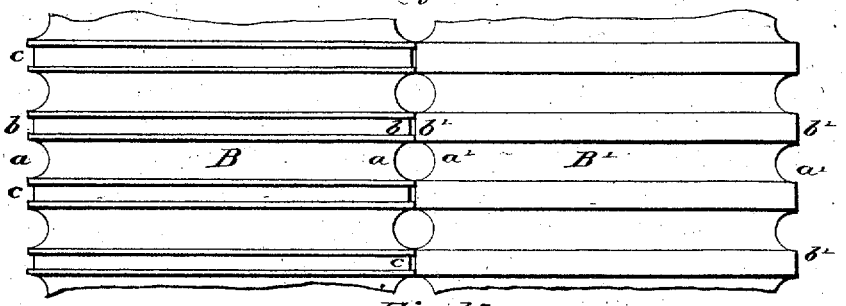
Figure 13:
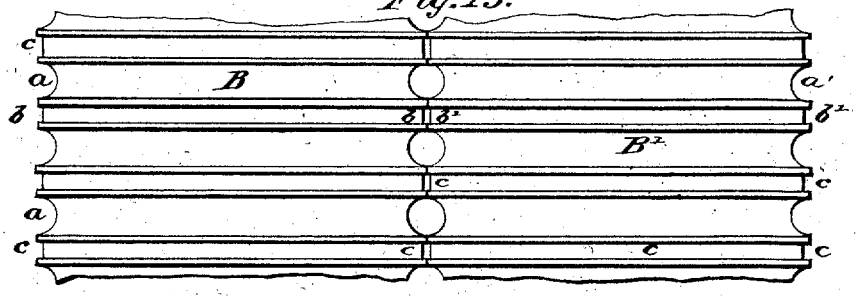

Figure 1 is an elevation of the left side of the machine. Fig. 2 is a plan of said machine. Fig. 3 is a longitudinal vertical section at and elevation of the parts back of the line $z$ and $z'$ in Figs. 2 and 6, as seen from the left side of the machine; Fig. 4, an elevation of a part of the right side of the machine. Fig. 5 is a plan of some parts not fully shown in Fig. 2. Fig. 6 is a transverse vertical section at and elevation of some parts back of the line $y$ $y^1$ $y^2$ in Figs. 1 and 3, as seen from the front end of the machine. Figs. 7, 8, 9, and 10 are vertical longitudinal sections of parts of said machine in various positions. Fig. 11 is the ordinary form of rollers. Figs. 12 and 13 are enlarged views of my rollers.

The same letters refer to like or corresponding parts, and the arrows on or by the parts indicate the direction in which the parts move.

In this specification the term "skin-covered sheets of dough" means a sheet of dough of which both sides have that compact impermeable surface which is formed by submitting a sheet of properly-prepared dough to the action of smooth rollers, and the phrase "skin-covered strip of dough" denotes a strip of dough, of a cylindrical or other suitable shape, which is entirely surrounded by a similar surface. In order to make a perfectly-shaped cracker it is necessary that its surface, before baking, be covered by a continuous and unbroken skin, except where the upper surface is pricked, as hereinafter stated, to permit of the escape of the gases generated in baking. Before the dough is placed in the machine it is rolled to form a skin-covered sheet. This sheet is then passed between grooved rollers having depressed bearings, which form the dough into skin-covered strips, from which the sections to form the crackers are severed. And the invention consists in the construction and combination of parts, as will be hereinafter more fully described, and pointed out by the claims.

To enable others skilled in the art to which it relates to make and use my said invention, I will describe the construction and operation thereof, which are as follows:

A is a stationary frame for supporting the active parts of the machine. $A^1$ is a feed-bed, composed of a succession of free rollers, which support the sheet of dough while it is being drawn into the machine. B $B^1$ are two rollers, grooved transversely to their axes, and turned in fixed bearings with equal, or nearly equal, surface-speed. The grooves $a$ of one roller are opposite to the like grooves $a^1$ in the other roller, and have the spaces $b$ between the grooves of one roller held firmly against the opposite space $b^1$ of the other roller. In the spaces between the grooves of one or both of the rollers B $B^1$, I construct continuous shallow channels or depressions $c$, for the purpose of cutting off the fin-like projections upon the strips of dough which result from passing them through the rollers, and which adhere to the strips where the rollers are plain, thus having channels in the spaces between the grooves. Better strips of dough can be made, and the rollers can be held together with less difficulty, and turned with less power, than if the spaces between the grooves were plain. These depressions also serve to fold or close more perfectly the edges of the strips as they pass between the rollers, thus forming a perfect skin-covered strip. The depression $c$ should be about the one-fiftieth of an inch deep, and should occupy three-fifths of the space between the grooves. C $C^1$ are scrapers fixed to the frame A for the purpose of clearing the surfaces $b$ $b^1$, and loosening the scraps of dough that form in the depressions $c$; and D $D^1$ are plain rotating rollers turned in fixed bearings for receiving the loosened tape-like scraps of dough from the scrapers C $C^1$, and conveying them to the troughs $D^2$ $D^3$.

The rollers F F′ are a second set of transversely-grooved rollers, that may be employed to guide the strips of dough in their passage from the rollers B $B^1$; but I find it is practicable to dispense with said rollers F F′, and to carry the strips of dough directly from the rollers B $B^1$, through the guides or ways hereinafter described, to the perforated bar G. Below and a little in front of the feed-rollers B $B^1$ I place the ways or guides E. These are shallow channels of tin or other suitable material, one for each strip of dough, and perpendicular to the axes of said rollers B $B^1$. These ways are so constructed as to spread apart the strips of dough as they come from the said feed-rollers and direct each strip to a passage between the rollers F F′, or, when these rollers are dispensed with, to an aperture in the perforated bar G, which is placed just below these rollers, and consists of a bar running parallel to the axes of the rollers B $B^1$, and perforated with numerous apertures, each of which is of sufficient size to admit of the passage of a strip of dough. The said feed-rollers B $B^1$ are made to turn and carry forward the strips of dough with an intermittent or step-by-step motion, in the following manner: The prime motive power of the machine is applied to the shaft $A^2$, which, by means of the pinion $a^2$ and spur-wheel $a^3$, turns the shaft $A^3$. The shaft $A^3$ has a crank, $B^2$, Figs. 2 and 4, which works the pitman $B^3$, that vibrates the arm $b^2$, which is loose on the axle of the roller F′, and carries a pawl, $b^3$, that turns the ratchet-wheel $C^3$, fast on the axle of the roller F′, and the roller F′ turns the roller F by the spur-wheels $c^1$ $c^2$, Fig. 1, and also turns the rollers B $B^1$ by the pinion $C^8$ and spur-wheels $E^1$ $E^2$, so that every time the shaft $A^3$ makes a revolution, the sets of rollers B $B^1$ and F F′ turn one step. When the second set of rollers F F′ are dispensed with, as above stated, the said ratchet-wheel $C^3$ is placed on the axle of the roller $B^1$, which turns the roller B by means of the spur-wheels $E^1$ $E^2$. In other respects the mechanism is the same.

Just below the perforated bar G, and parallel with it, is placed the thin knife or blade H. This knife slides in fixed ways $e^1$ $e^2$, Figs. 3 and 5, and is worked by a rod, $e^3$, that slides in the guide $f$ past the shaft $A^3$. The cam $f^1$ on the shaft $A^3$ strikes against the projection $f^2$ on the rod $e^3$, and thereby draws back the knife H just before the rollers B $B^1$ begin a step, and retains it there until those rollers turn a step, and until the clamp-bars I I′ come together, when the said cam $f^1$ leaves the said projection $f^2$, and the spring O′ drives the knife swiftly through the strips of dough. Under the said knife H, and parallel with the same, I place the clearer K, for the purpose of removing the pressed crackers which may adhere to the knife. This clearer is worked by the shaft $A^3$ by means of the eccentric P′, connected with the clearer by the rod $f^3$. Below the knife and clearer are the clamp-bars I I′, which inclose or hold the short sections or pellets of dough at the moment when they are severed from strips by the action of the knife H, as aforesaid, and which separate and leave the sections so severed as soon as the press-plate hereinafter described rises to press said sections. Under the perforated bar G, and parallel therewith, is the press-plate J, which is so arranged that after the short sections of dough are cut from the strips, and while they are held by the clamp-bars I $I^1$, it will rise up and flatten the sections of dough against the knife H.

The said press-bar is covered by the endless apron L, hereinafter mentioned; and in order to prevent the crackers, when pressed, from adhering to the apron, I make the press-plate J with concavities $g$, Figs. 3 and 6, at the places where the crackers are pressed, so that the pressed pieces shall be a little convex on their under side, and will more readily free themselves from the apron as it straightens out of the depressions.

L is an endless apron, passing over the press-plate J, and between several sets of rollers, for the purpose of rolling the pressed cracker and completing the skin at the points where it has been severed from the skin-covered strips, as aforesaid.

M $M^1$ $M^2$ are smooth plain rollers, arranged across and over the apron L, and revolved in fixed bearings, for the purpose of rolling the pressed crackers as they are carried under these rollers by the apron L. The free roller N and pair of friction-rollers $N^1$ $N^1$ $N^2$ $N^2$ are arranged under the apron, for the purpose of giving a better shape to the cracker as it passes under the rollers M $M^1$ $M^2$. O is a fixed docker or bar of prick-points. P is a rising and descending plate under the docker and apron L. Q is a movable plate, for freeing the crackers from the docker, perforated in such a manner that the prick-points pass through it, and so that it will move freely up and down said points.

At the ends of the clearer-plate Q are placed the springs $g$ $g'$, by which, after the descent of the press-plate P, the plate Q is forced down, shedding the crackers from the prick-points in its descent.

R R′ are rising and descending straight-edges, for evening the rows of crackers before they are rolled and docked. They are so constructed that they are raised up whenever the apron L stops moving, and descend to the surface of the apron a moment after it starts again. T is a fixed inclined plane at the point where the endless apron L passes over the last roller $e^1$, and upon which the crackers are carried by said apron after they have been properly rolled and docked. U is a follower, so constructed that it moves down the inclined plane T when the apron L stops, and when it again moves forward the said follower is carried back up the inclined plane, and is elevated sufficiently to allow a row of crackers to pass under it. S is an endless apron, moving in the same direction as the motion of the apron L, and upon which the bake-pans V are placed, for the purpose of receiving the completed crackers as they are pushed down by the follower U.

The operation of my said invention is as follows: A sheet of skin-covered dough is placed upon the feed-bed $A^1$, and one end thereof inserted between the grooved rollers B $B^1$. By the action of these rollers the sheet of dough is divided into the skin-covered strips Y.

The scrapers C $C^1$ press against the rollers B $B^1$, and loosen up the tape-like scraps of dough from the depressions *c*, which fall upon the rollers D $D^1$, and are thrown into the troughs $D^2$ $D^3$. From the said strip-producing rollers B $B^1$ the strips of dough pass into and through the guides E, which spread apart the said strips and guide them into the passages between the rollers F F′, or into the passages through the perforated bar G, when neither the rollers F F′ nor any substitute therefor, but only the strip-producing rollers B $B^1$, are used to feed the strips of dough through the bar G. The rollers B $B^1$ are turned, by the means hereinbefore described, with a step-by-step motion, and every time they turn a step they produce and feed down through the fixed bar G enough of each strip of dough to form a cracker. As soon as the rollers stop turning, the clamp-bars I I′ close upon the said strips of dough a little way below the said bar G, as seen in Figs. 3 and 5. Then the thin broad blade or knife H is driven with a sudden blow through the strips of dough close under the bar G, and stops there, over the upper ends of the severed pieces X, as shown in Figs. 7 and 8. The bar I keeps the pieces of dough from being carried away by the knife as it severs them from the strips, and the two bars I I′ keep the pieces from falling on their sides until the press plate J holds them against the knife H. Just after the knife cuts off the pieces or sections X the press-plate J rises, and when it begins to flatten the said pieces of dough endwise against the knife H, the bars I I′ fly open or away from the said pieces X, as shown in Fig. 8, so as to leave the pieces free to expand sidewise as the press-plate rises to the highest position shown in Fig. 9. Then the press-plate, with the apron L over it, begins to descend, and at the same time the thin sharp clearer K, which shaves the under side of the knife, moves forward and loosens the flattened pieces of dough that stick to the knife, while they are nearly in line with those that adhere to the apron, and then moves back with the knife from under the ends of the strips of dough, as in Fig. 10, while the press-plate and apron finish their descent, and the apron, with the row of crackers thereon, advances a step. Then the strips of dough are again fed down through the bar G by another turn of the rollers B $B^1$, and pieces are cut off, flattened endwise, and moved forward, as just described. As the newly-pressed row of crackers moves forward with the apron from the press-plate J, the straight-edge R′ descends upon th apron in front of said row, and straightens it, as the crackers are carried against it by the movement of the apron. It is raised up as the apron stops, and remains elevated long enough to permit the row just straightened to pass under it as the apron starts again, and it descends again in time to meet the next succeeding row. After being straightened in this manner, the row of crackers passes successively between the rollers M N and $M^1$ $N^1$, and $M^2$ and $N^2$ $N^2$. By means of these rollers the skin on the top and bottom of the crackers is completed, and the circular shape of the crackers is preserved. As the row of crackers leaves the last set of rollers it is again evened by the straight-edge R, and then passes under the docker O.

The step-by-step motion of the apron L is such that every time it stops it leaves a row of crackers under the said docker. Then the plate P raises the row against the points of the docker and descends before the apron starts again. As the plate P rises it lifts the plate Q, so as to bare the points of the docker to the crackers, and, as the plate P descends, the plate Q follows down or by means of the spring at *g g*, and sheds the row of crackers from the docker, which crackers are then carried forward at the next step of the apron. After the row of crackers leaves the docker it is deposited by the apron on the inclined plane T. For each step of the apron L the apron S moves the bake-pan V forward, either by a step-by-step or a constant motion, the proper distance to receive a row of crackers, and every time the apron L leaves a row of crackers at the top of the fixed inclined plane T the follower U is brought down back of the row, and is then moved down the inclined plane, sliding the row of crackers in front of it onto the bake-pan. The follower then returns up the said inclined plane, and at the top is elevated and passes over the next row of crackers just deposited by the apron L, after which it descends back of the last-named row and moves it onto the bake-pan. When filled, the bake-pan is removed to the oven and its place supplied by another.

What I claim as my invention is—

1. The inclined feed-bed of free rollers $A^1$, in combination with the rollers, substantially as and for the purpose set forth.

2. The grooved rollers, provided with the depressions in the bearings, substantially as and for the purpose set forth.

3. In combination with a pair of transversely-grooved rollers, arranged to form strips from a sheet of dough, devices for giving to the rollers a regular intermittent or step-by-step motion, substantially as described, so that the strips may be severed into short sections while at rest.

4. The combination of a pair of transversely-grooved rollers, capable of producing strips of dough from a sheet thereof, and having a regular intermittent movement, a guide-bar for supporting the strips of dough, and a knife having an intermittent motion for severing the strips of dough into short sections.

5. The ways or guides E, in combination with grooved rollers, substantially as and for the purpose set forth.

6. The perforated bar G, in combination with the ways or guides E, substantially as and for the purpose herein set forth.

7. A pair of transversely-grooved rollers, ways, or guides, E, perforated bar G, and knife H, all combined and operated substantially as herein set forth.

8. The combination of the knife H and clamp-bars I I, as herein described, whereby sections of the strips of dough are cut off and held as the strips are fed through the bar G, as specified.

9. The combination, substantially as described, of the clearer K with the knife H, against which the short sections of dough are pressed endwise.

10. The straight-edge R′, for straightening the rows of crackers before rolling, in combination with the apron and rollers, substantially as described.

11. The endless apron L, inclined plane T, follower U, and second endless apron S, all combined and operated substantially in the manner and for the purpose herein described and specified.

12. The docker O, in combination with the plate P and apron L, substantially as and for the purpose set forth.

13. The docker O, apron L, and plate P, in combination with the movable plate Q, substantially as and for the purpose set forth.

14. The combination of the knife H and press-bar J, substantially as and for the purpose set forth.

15. The press-bar J, in combination with the apron L and docker O, for the purpose set forth.

16. The grooved rollers and the press-bar J, in combination with the apron L and docker O, substantially as and for the purpose set forth.

17. The inclined plane T, in combination with an apron or carrier, L, in a cracker-machine, substantially as and for the purpose set forth.

In testimony that I claim the foregoing I have hereunto set my hand.

JOSEPH FOX.

Witnesses:
EUGENE HYATT,
JAMES E. BUELL.